United States Patent
Nakamura et al.

(10) Patent No.: US 8,934,016 B2
(45) Date of Patent: Jan. 13, 2015

(54) VIDEO DISPLAY APPARATUS AND VIDEO DISPLAY METHOD

(75) Inventors: Yoichi Nakamura, Kanagawa (JP); Shinji Nakamura, Kanagawa (JP)

(73) Assignee: Panasonic Corporation, Osaka (JP)

( * ) Notice: Subject to any disclaimer, the term of this patent is extended or adjusted under 35 U.S.C. 154(b) by 1240 days.

(21) Appl. No.: 12/526,695

(22) PCT Filed: Feb. 12, 2008

(86) PCT No.: PCT/JP2008/000203
§ 371 (c)(1),
(2), (4) Date: Aug. 11, 2009

(87) PCT Pub. No.: WO2008/102525
PCT Pub. Date: Aug. 28, 2008

(65) Prior Publication Data
US 2010/0066836 A1    Mar. 18, 2010

(30) Foreign Application Priority Data
Feb. 19, 2007    (JP) ................ 2007-037899

(51) Int. Cl.
| | | |
|---|---|---|
| *H04N 7/18* | (2006.01) | |
| *H04N 5/66* | (2006.01) | |
| *H04N 5/232* | (2006.01) | |
| *H04N 7/173* | (2011.01) | |
| *H04N 21/4223* | (2011.01) | |
| *H04N 21/472* | (2011.01) | |

(Continued)

(52) U.S. Cl.
CPC .............. *H04N 7/181* (2013.01); *H04N 5/232* (2013.01); *H04N 5/23206* (2013.01); *H04N 5/23293* (2013.01); *H04N 7/17318* (2013.01); *H04N 21/4223* (2013.01); *H04N 21/47202* (2013.01); *H04N 21/6377* (2013.01); *H04N 21/658* (2013.01); *H04N 21/6587* (2013.01)
USPC ..................... 348/159; 348/143; 348/588

(58) Field of Classification Search
None
See application file for complete search history.

(56) References Cited

U.S. PATENT DOCUMENTS

| | | | |
|---|---|---|---|
| 5,625,410 A * | 4/1997 | Washino et al. | 348/154 |
| 6,229,570 B1 * | 5/2001 | Bugwadia et al. | 348/441 |

(Continued)

FOREIGN PATENT DOCUMENTS

| | | | | |
|---|---|---|---|---|
| EP | 0776130 A2 * | 5/1997 | | H04N 7/15 |
| JP | 8-163556 A | 6/1996 | | |

(Continued)

OTHER PUBLICATIONS

International Search Report for PCT/JP2008/000203.
(Continued)

*Primary Examiner* — Patrice Winder
(74) *Attorney, Agent, or Firm* — Pearne & Gordon LLP

(57) ABSTRACT

A client PC receives video data distributed from a plurality of camera units and displays a plurality of video images as multiple screens on a screen of a display. At this time, the reception rate of the video data distributed from the camera unit to be controlled in pan, tilt, etc., is increased and the reception rate of the video data distributed from the different camera unit is decreased, whereby the frame rate of a split screen for displaying the video image picked up by the camera unit to be controlled is made higher than the frame rate of the different camera unit and it is made possible to visually recognize the video image clearly during the camera control.

12 Claims, 6 Drawing Sheets

(51) Int. Cl.
*H04N 21/6377* (2011.01)
*H04N 21/658* (2011.01)
*H04N 21/6587* (2011.01)

(56) References Cited

U.S. PATENT DOCUMENTS

| | | | |
|---|---|---|---|
| 6,317,152 | B1 | 11/2001 | Hobson et al. |
| 6,337,928 | B1 | 1/2002 | Takahashi et al. |
| 6,456,335 | B1* | 9/2002 | Miura et al. .................. 348/159 |
| 6,549,948 | B1 | 4/2003 | Sasaki et al. |
| 6,654,498 | B2 | 11/2003 | Takahashi et al. |
| 7,386,174 | B2 | 6/2008 | Takahashi et al. |
| 7,525,576 | B2* | 4/2009 | Kannermark et al. ..... 348/222.1 |
| 2001/0019360 | A1* | 9/2001 | Tanaka et al. ................. 348/211 |
| 2001/0052131 | A1 | 12/2001 | Hobson et al. |
| 2004/0196378 | A1* | 10/2004 | Kannermark et al. ... 348/207.99 |
| 2005/0018049 | A1 | 1/2005 | Falk |
| 2005/0036036 | A1* | 2/2005 | Stevenson et al. ....... 348/211.99 |
| 2007/0273762 | A1* | 11/2007 | Steensma et al. ............. 348/143 |

FOREIGN PATENT DOCUMENTS

| | | |
|---|---|---|
| JP | 10-70673 A | 3/1998 |
| JP | 10-136246 A | 5/1998 |
| JP | 2002-351438 A | 12/2002 |
| JP | 2003-289528 A | 10/2003 |
| JP | 2005-45550 A | 2/2005 |
| JP | 2007-036615 A | 2/2007 |
| WO | 01/06790 A1 | 1/2001 |

OTHER PUBLICATIONS

European Search Report for Application No. 08710357.8-2223/2124445 dated Jan. 27, 2012.

Jenq-Neng Hwang, et al., "On realtime remote display of a digital video recording system", Acoustics, Speech, and Signal Processing, 2004. Proceedings. (ICASSP '04). IEEE International Conference on Montreal, Quebec, Canada May 17-21, 2004, Piscataway, NJ, USA, IEEE, vol. 5, pp. 861-864, XP010719065, ISBN: 978-0-7803-8484-2.

Jaynes C, et al., "Introduction", Computer Vision for Interactive and Intelligent Environment, 2005 Lexington, KY, USA, Nov. 17-18, 2005, Piscataway, NJ, USA, IEEE,, pp. 3-14, XP010911865, DOI: 10.1109/CVIIE.2005.12, ISBN: 978-0-7695-2524-2.

* cited by examiner

VIDEO DISPLAY APPARATUS AND VIDEO DISPLAY METHOD

TECHNICAL FIELD

This invention relates to a video display apparatus and a video display method for displaying video images provided by video input sections of a plurality of cameras, etc., on a screen.

BACKGROUND ART

As a video display apparatus for displaying a video image taken by a camera, etc., on a screen, for example, a video display system for transmitting a video signal through a network and displaying a video image on an image display section in a different location is available. Such a video display system using a network is used for a monitor camera system for monitoring the taken video images of target areas intensively at a distant location, etc.

As this kind of video display system, a camera control system for improving operability of each camera and lightening the load on a network is known (refer to patent document 1). In the camera control system, when a button provided on an operation screen is operated, a camera operation unit commands a camera management unit to set the angle previously assigned to the button. The camera management unit prohibits transfer of video data until the specified angle is set, and changes the angel at high speed. Accordingly, camera angle change is speeded up and the load on the network at the time can be decreased.

However, the conventional camera control system described above involves the following problem: The camera operation unit (client PC) suppresses transfer of a video image from the camera during the pan/tilt operation in exchange for operability improvement of pan/tilt of the camera to be operated (to be controlled). Thus, the video image displayed on the screen during the pan/tilt operation becomes intermittent and thus it is difficult to finely adjust pan/tilt of the camera while seeing the displayed video image.

The camera control system described above produces single screen display of displaying only a video image from one camera on a display section; however, there is a demand for enabling the user to visually check a plurality of video images at a glance on multiple screen display in one monitor in a monitor camera system for monitoring intensively at a distant location, etc. Usually, a video display system for displaying multiple screens on a display section involves capability restrictions of the network and the units and thus the frame rate of each screen needs to be decreased to suppress the unit load on the display section. Since the transmission capacity and the processing capability of video data in the whole system are almost determined, moving image display is restricted particularly as the number of screens displayed at a time increases. Also in this case, the video image displayed on the screen during the pan/tilt operation becomes intermittent and it is difficult to finely adjust pan/tilt of the camera as with the single screen display.

Patent document 1: Japanese Patent Laid-Open No. 136246/1998

DISCLOSURE OF THE INVENTION

Problems to be Solved by the Invention

As described above, in the conventional video display apparatus, the video image displayed during the camera control operation of pan, tilt, etc., becomes coarse and thus there is a problem in that it is difficult to finely adjust the camera while seeing the displayed video image. Particularly, to produce multiple screen display of displaying a plurality of video images in one monitor, the system resources of the network, the units, etc., the video image display rate, etc., decreases and the case where camera adjustment is hindered can also occur.

In view of the circumstances, it is an object of the invention to provide a video display apparatus and a video display method capable of enhancing the quality of a video image corresponding to a video input section of an image pickup section to be controlled for controlling the image taking angle of view, etc., as compared with that of any other and improving the operability at the image pickup section control time to display a plurality of video images as multiple screens in one screen.

Means for Solving the Problems

A video display apparatus of the invention is a video display apparatus for displaying video images provided by a plurality of video input sections on a screen and includes a screen display section for displaying a plurality of video images provided by the plurality of video input sections containing at least one image pickup section as multiple screens in one screen and a display video quality control section, if the image pickup section to be controlled exists in the plurality of video input sections, the display video quality control section for increasing the update frequency of the screen for displaying the video image taken by the image pickup section to be controlled in the screen display section as compared with the update frequency of the screen for displaying a video image from any other video input section.

Accordingly, to display the video images provided by the plurality of video input sections as multiple screens in one screen, if at least one image pickup section to be controlled for performing control operation of pan, tilt, etc., for adjusting the image pickup area, the angle of view, etc., for example, exists in the plurality of video input sections, the quality of the screen corresponding to the image pickup section to be controlled can be enhanced as compared with that of any other and when operation of pan, tilt, etc., is performed for the image pickup section, it is made possible to improve operability.

The video display apparatus of the invention further includes a control target determination section for determining whether or not the image pickup section to be controlled exists among the plurality of video input sections and a control time determination section for determining whether or not a predetermined time has elapsed since the image pickup section was placed out of the control target, wherein when the predetermined time has elapsed, the display video quality control section restores the update frequency of the screen corresponding to the image pickup section placed out of the control target in the screen display section to the former update frequency.

Accordingly, the update frequency of the screen corresponding to the image pickup section placed out of the control target is restored to the former update frequency, whereby the quality of each display screen can be automatically restored to the former state and it is made possible to improve the ease of use responsive to the situation.

The invention is the video display apparatus described above wherein the display video quality control section increases the distribution frame rate of the video data distributed from the image pickup section to be controlled and decreases the distribution frame rate of the video data distributed from any other video input section.

Accordingly, for the screen corresponding to the image pickup section to be controlled, it is made possible to change the update frequency of the screen and adjust the quality of the screen. At this time, if the transmission capacity of the transmission line of the distribution network, etc., is limited, etc., the quality of the screen of the control target can be enhanced and a plurality of display screens can be adjusted appropriately within the transmission capacity.

The invention is the video display apparatus described above wherein the display video quality control section increases the decode frame rate in decoding the video data coded by the image pickup section to be controlled and decreases the decode frame rate in decoding the video data coded by any other video input section.

Accordingly, for the screen corresponding to the image pickup section to be controlled, it is made possible to change the update frequency of the screen and adjust the quality of the screen. At this time, the display video quality control section need not communicate with the image pickup section to be controlled, so that the video display apparatus can be easily implemented regardless of the configuration of the transmission line of the network, etc. It is effective for one-to-multiple communications such as multicast wherein the transmission capacity of the transmission line can be decreased.

The invention is the video display apparatus described above wherein the display video quality control section increases the drawing frame rate in drawing using the video data from the image pickup section to be controlled and decreases the drawing frame rate in drawing using the video data from any other video input section.

Accordingly, for the screen corresponding to the image pickup section to be controlled, it is made possible to change the update frequency of the screen and adjust the quality of the screen. At this time, the display video quality control section need not communicate with the image pickup section to be controlled, so that the video display apparatus can be easily implemented regardless of the configuration of the transmission line of the network, etc. It is effective for one-to-multiple communications such as multicast wherein the transmission capacity of the transmission line can be decreased.

The invention is the video display apparatus described above wherein the display video quality control section increases the update frequency of the screen for displaying the video image taken by the image pickup section to be controlled and makes high the image quality of the video image distributed from the image pickup section to be controlled as compared with the image quality of the video image distributed from any other video input section.

Accordingly, in addition to increasing of the update frequency of the screen, for example, the coding efficiency of the compression ratio, etc., the resolution of the image, focus, etc., is adjusted for making the image quality good, whereby the screen corresponding to the image pickup section to be controlled can be made clearer and it is made possible to furthermore improve operability.

The invention is the video display apparatus described above wherein the display video quality control section changes the update frequency using at least two of the distribution frame rate of the video data distributed from the image pickup section to be controlled, the decode frame rate in decoding the video data, and the drawing frame rate in drawing using the video data.

Accordingly, various frame rate changes are combined as desired, whereby the flexibility when the update frequency of the screen corresponding to the image pickup section to be controlled is changed can be increased.

A video display apparatus of the invention is a video display apparatus for displaying a video image taken by an image pickup section on a screen and includes a screen display section for displaying the video image provided by the image pickup section, a control target determination section for determining whether or not the image pickup section is to be controlled, and a display video quality control section, if the image pickup section is to be controlled, the display video quality control section for increasing the update frequency of the screen for displaying the video image taken by the image pickup section in the screen display section as compared with the update frequency of the screen applied if the image pickup section is to be uncontrolled.

Accordingly, the update frequency of the screen for displaying the video image provided by the image pickup section when the image pickup section is placed in the control target can be made higher than the update frequency of the screen applied when the image pickup section is placed out of the control target, and it is made possible to improve the operability at the image pickup section control time.

A video display method of the invention is a video display method in displaying video images provided by a plurality of video input sections on a screen and has a screen display step of displaying a plurality of video images provided by the plurality of video input sections containing at least one image pickup section as multiple screens in one screen in a screen display section, a control target determination step of determining whether or not the image pickup section to be controlled exists among the plurality of video input sections, and a display video quality control step, if the image pickup section to be controlled exists in the plurality of video input sections, the display video quality control step of increasing the update frequency of the screen for displaying the video image taken by the image pickup section to be controlled in the screen display section as compared with the update frequency of the screen for displaying a video image from any other video input section.

An information processing apparatus of the invention is an information processing apparatus being connected to a plurality of video input sections containing at least one image pickup section for displaying a video image on a display using the video data provided by the video input sections and includes a screen display section for displaying a plurality of video images provided by the plurality of video input sections containing the image pickup section as multiple screens in one screen on the display, a control target determination section for determining whether or not the image pickup section to be controlled exists among the plurality of video input sections, and a display video quality control section, if the image pickup section to be controlled exists in the plurality of video input sections, the display video quality control section for increasing the update frequency of the screen for displaying the video image taken by the image pickup section to be controlled on the display as compared with the update frequency of the screen for displaying a video image from any other video input section.

The invention also provides a program for causing a computer to function as the means of any of the video display apparatus described above.

Advantages of the Invention

The invention can provide a video display apparatus and a video display method capable of enhancing the quality of a video image corresponding to a video input section of an image pickup section to be controlled for controlling the image taking angle of view, etc., as compared with that of any other and improving the operability at the image pickup section control time to display a plurality of video images as multiple screens in one screen.

DESCRIPTION OF REFERENCE NUMERALS

Figure 1:
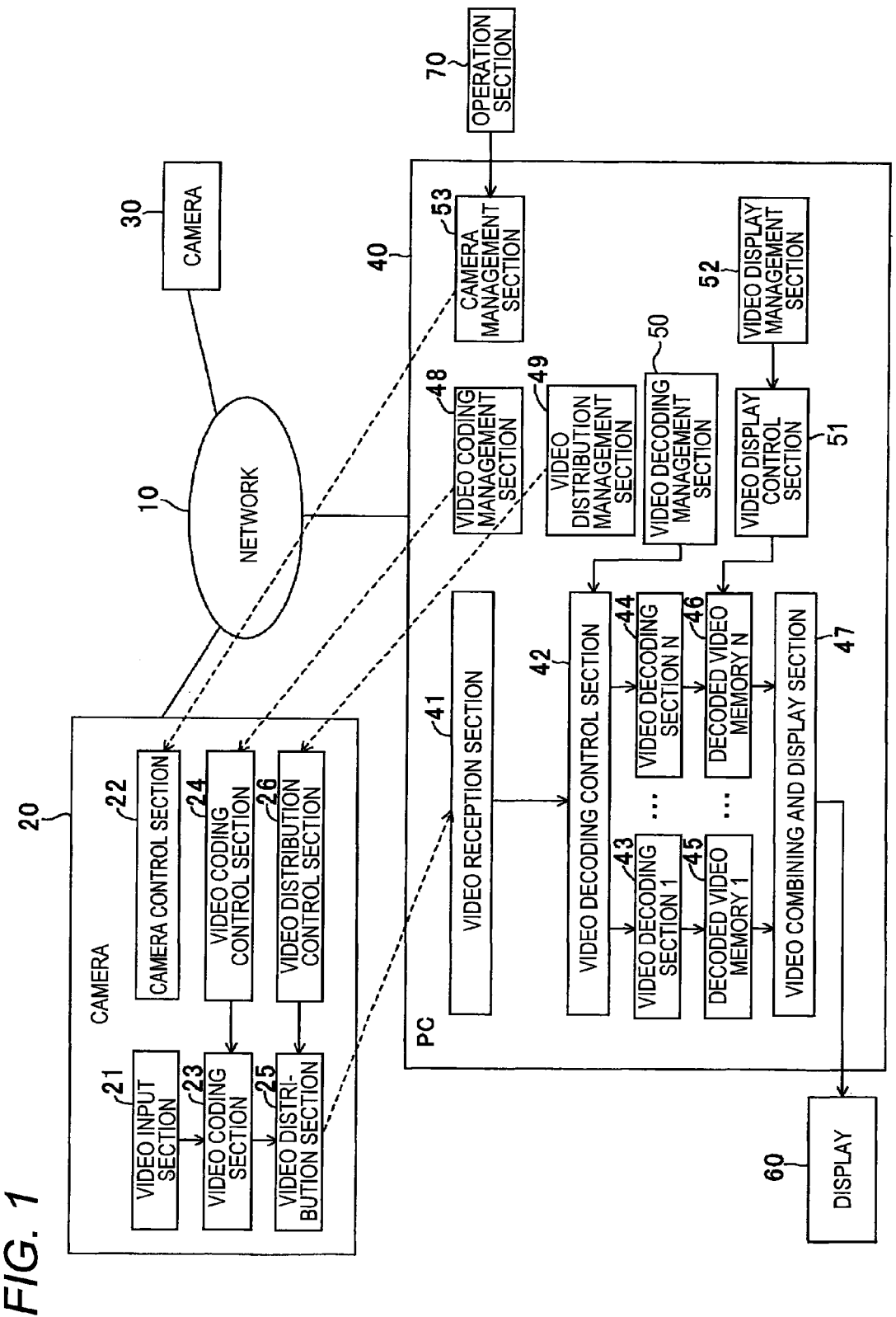
FIG. 1 is a diagram to show the configuration of a multi-video monitor system in a first embodiment of the invention.

10 Network
20, 30 Camera
21 Video input section
22 Camera control section
23 Video coding section
24 Video coding control section
25 Video distribution section
26 Video distribution control section
40 Client PC
41 Video reception section
42 Video decoding control section
43, 44 Video decoding section
45, 46 Decoded video memory
47 Video combining and display section
51 Video display control section
60 Display
70 Operation section

BEST MODE FOR CARRYING OUT THE INVENTION

Each embodiment shows a configuration example of application to a multi-video monitor system wherein a plurality of camera units and a client PC are connected through a network and video images taken by the plurality of camera units are displayed as multiple screens at the same time in one screen of a display connected to the client PC as an example of video display apparatus.

(First Embodiment)

FIG. 1 is a diagram to show the configuration of a multi-video monitor system in a first embodiment of the invention. In the multi-video monitor system, camera units 20 and 30 of a plurality of image pickup sections which become each a video input section and a video transmission section and a client PC 40 which becomes a video reception section and a video processing section are connected through a network 10. For example, an IP network, etc., is used as the network 10 and a camera unit at a remote location can be connected for enabling a guard to visually check the video image of a photograph area at hand. The multi-video monitor system is used for the monitor purpose of a predetermined position and a predetermined area for security, etc. In the embodiment, the case where 16 camera units are connected to the network 10 will be discussed as an example, but only some camera units are drawn in FIG. 1 and other camera units are not shown. As the video input section, not only the camera unit, but also a recorder for recording video data, a storage unit for storing video data, etc., is used. The number of camera units and the number of client PCs are not limited.

The camera unit 20 is made up of a video input section 21, a camera control section 22, a video coding section 23, a video coding control section 24, a video distribution section 25, and a video distribution control section 26. The camera unit 30 has a similar configuration to that of the camera unit 20 and therefore will not be discussed again.

The video input section 21 has an image pickup section for photographing a subject and outputting video data thereof. The camera control section 22 controls the pan/tilt direction for adjusting the image pickup area of the image pickup section and also performs zoom control, focus adjustment, etc., for adjusting the image pickup angle of view. The video coding section 23 compresses and codes video data according to a predetermined coding system. For example, JPEG, MPEG-4, etc., is used as the coding system. The video coding control section 24 controls the video coding section 23 in accordance with a command from the client PC 40 and changes the coding efficiency of the compression ratio, etc., in coding video data. The video distribution section 25 distributes the coded video data to the client PC 40 through the network 10. The video distribution control section 26 controls the video distribution section 25 and changes the distribution frame rate of the number of frames per unit time, etc., in the video data distributed from the camera unit in accordance with a command from the client PC 40.

The client PC 40 has a similar hardware configuration to that of a general-purpose PC. The client PC 40 is made up a video reception section 41, a video decoding control section 42, video decoding sections 43 and 44, decoded video memories 45 and 46, a video combining and display section 47, a video coding management section 48, a video distribution management section 49, a video decoding management section 50, a video display control section 51, a video display management section 52, and a camera management section 53. The client PC 40 is also provided with a display 60 for an operator to view and an operation section 70 for the operator to operate.

The video reception section 41 receives video data distributed from the camera units 20 and 30. The video decoding control section 42 distributes the video data received from the camera units 20 and 30 to the video decoding sections 43 and 44 corresponding to the camera units and controls the video decoding sections 43 and 44 and changes the decode frame rate, etc. The video decoding sections 43 and 44 decode the coded video data. The decoded video memories 45 and 46 store the video data decoded by the video decoding sections 43 and 44. The video combining and display section 47 reads the video data stored in the decoded video memories 45 and 46 and performs display control of multiple screen display (multi-screen display) for displaying as multiple screens at the same time in one screen so as to display the video data on the display 60 for each channel (CH).

The video coding management section 48 specifies the coding efficiency of the compression ratio, etc., through the network 10 for the video coding control section 24 in each of the camera units 20 and 30. The video distribution management section 49 specifies the distribution frame rate of video data, etc., for the video distribution control section 26 in each of the camera units 20 and 30. The video decoding management section 50 specifies the decode frame rate, etc., for the video decoding control section 42. The video display control section 51 controls the drawn frame rate of the video data stored in each of the decoded video memories 45 and 46. As the control of the drawn frame rate, control of changing the number of update frames per unit time of the video data stored in the decoded video memory, control of changing the number of read frames per unit time of the video data read from the decoded video memory, or control of changing the display area of the video data stored in the decoded video memory is performed. The video display management section 52 specifies the drawn frame rate of video data for the video display control section 51.

The camera management section 53 commands the camera control section 22 in each of the camera units 20 and 30 to perform control of the pan/tilt direction, zoom control, focus adjustment, etc., in accordance with a command from the operation section 70.

The functions of the sections in the client PC 40 are realized as a CPU in the client PC 40 executes a control program stored in a storage medium of memory, storage, etc., and performs predetermined processing. In the configuration described above, the function of a screen display section is realized by the video combining and display section 47 of the client PC 40, the display 60, and the like. The function of a display video quality control section is realized by the video coding control section 24 and the video distribution control section 26 of the camera unit 20 and the video decoding control section 42 and the video display control section 51 of the client PC 40, etc. The functions of a control target determination section and a control time determination section are realized by the camera management section 53 of the client PC 40, etc.

Figure 2:
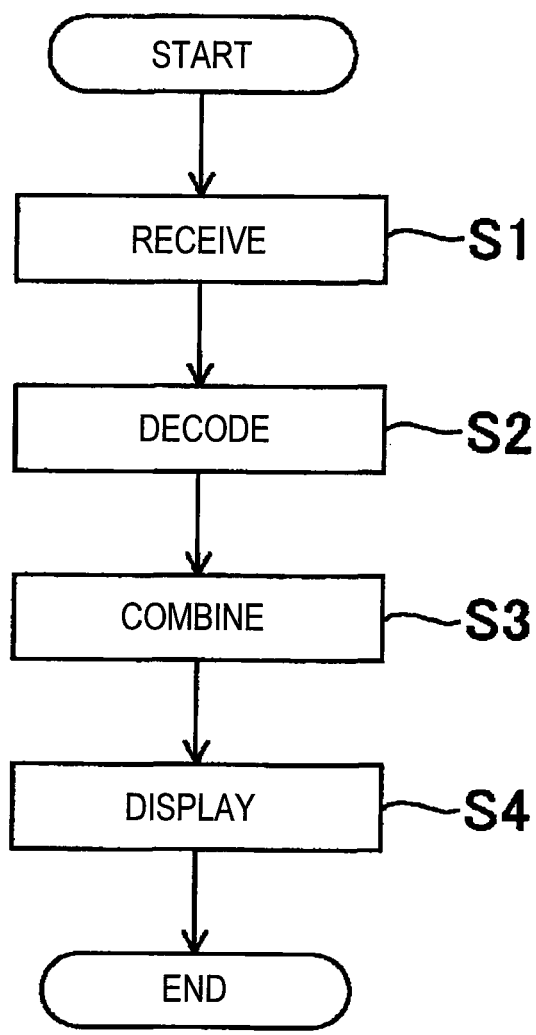
FIG. 2 is a flowchart to show a video display operation procedure in the multi-video monitor system of the embodiment.

The operation of the multi-video monitor system having the configuration described above will be discussed. FIG. 2 is a flowchart to show a video display operation procedure in the multi-video monitor system. The processing program is stored in a storage medium of memory, storage, etc., in the client PC 40 and is repeated every predetermined timing by the CPU in the client PC 40.

To begin with, the client PC 40 receives video data distributed from the camera units 20 and 30 by the video reception section 41 (step S1) and decodes the received video data by the video decoding sections 43 and 44 and stores the data in the decoded video memories 45 and 46 (step S2). The client PC 40 reads and combines the video data stored in the decoded video memories 45 and 46 and generates composite video data by the video combining and display section 47 (step S3). The client PC 40 outputs the composite video data provided by the video combining and display section 47 to the display 60 and causes the display 60 to produce multiple screen display (step S4). Then, the processing is terminated.

Figure 3:
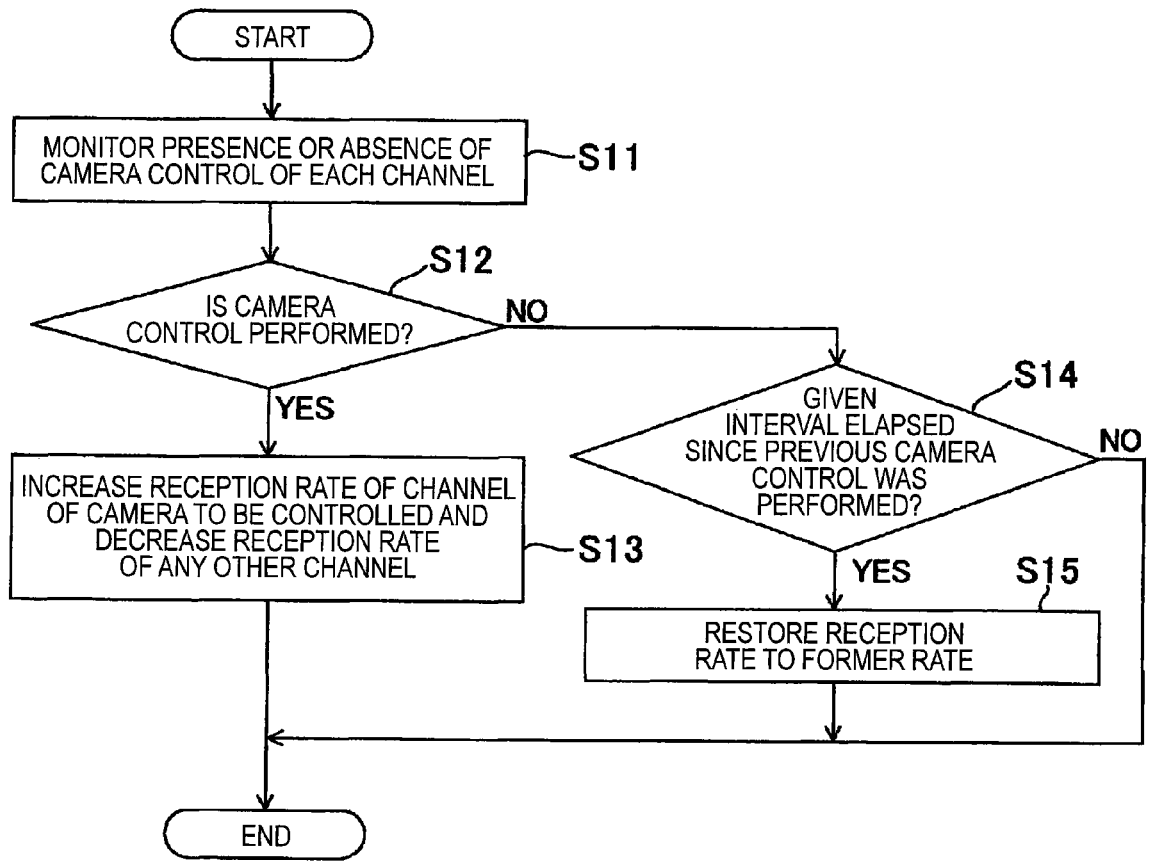
FIG. 3 is a flowchart to show a distribution frame rate change processing procedure in the first embodiment.

FIG. 3 is a flowchart to show a distribution frame rate change processing procedure for changing the distribution frame rate of video data distributed from each camera unit. The processing program is stored in a storage medium in the client PC 40 and is repeated every predetermined period (for example, 1 sec) by the CPU in the client PC 40.

To begin with, the client PC 40 monitors the control state of the camera unit corresponding to each channel displayed as multiple screens on the display 60 by the camera management section 53 (step S11). Here, the camera management section 53 checks the camera unit operated through the operation section 70, thereby monitoring the control state of the camera unit.

As a result of monitoring the control state of each camera unit, the client PC 40 determines whether or not camera control is performed, namely, whether or not the camera unit to be controlled exists (step S12). If camera control is performed, to increase the reception rate of the channel of the video data distributed from the camera unit to be controlled and decrease the reception rate of any other channel, the client PC 40 commands the corresponding camera units 20 and 30 to change the distribution frame rate of video data by the video distribution management section 49 (step S13). According to the command, in the camera units, control is performed so that the distribution frame rate is increased for the camera unit to be controlled and the distribution frame rate is decreased for any other camera unit. Then, the processing is terminated.

On the other hand, if camera control is not performed at step S12, the client PC 40 determines whether or not a given time interval (for example, 10 seconds) has elapsed since the previous camera control was performed (step S14). When the given time interval does not elapse, the processing is terminated. On the other hand, when the given time interval has elapsed, the client PC 40 commands each camera unit to restore the distribution frame rate to the former initial value by the video distribution management section 49 (step S15). Then, the processing is terminated.

At step S11, whether or not the camera unit to be controlled (operated) exist may be determined as the CPU in the client PC 40 performs polling operation for the camera unit of each channel, or the camera unit to be controlled may be determined by accepting an interrupt signal output from the camera unit to be controlled.

Figure 4:
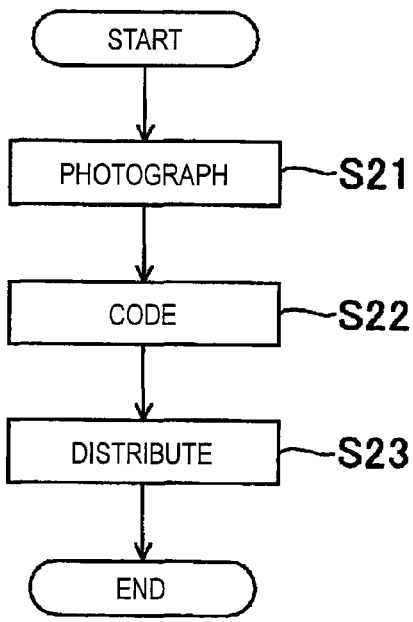
FIG. 4 is a flowchart to show a video distribution operation procedure of a camera unit in the embodiment.

FIG. 4 is a flowchart to show a video distribution operation procedure of the camera unit 20. This operation is repeated every predetermined timing. To begin with, the camera unit 20 picks up an image and generates video data thereof by the video input section 21 (step S21). The camera unit 20 codes the video data according to the predetermined coding system by the video coding section 23 (step S22). The camera unit 20 distributes the coded video data to the client PC 40 through the network 10 by the video distribution section 25 (step S23). Then, the operation is terminated.

Figure 5:
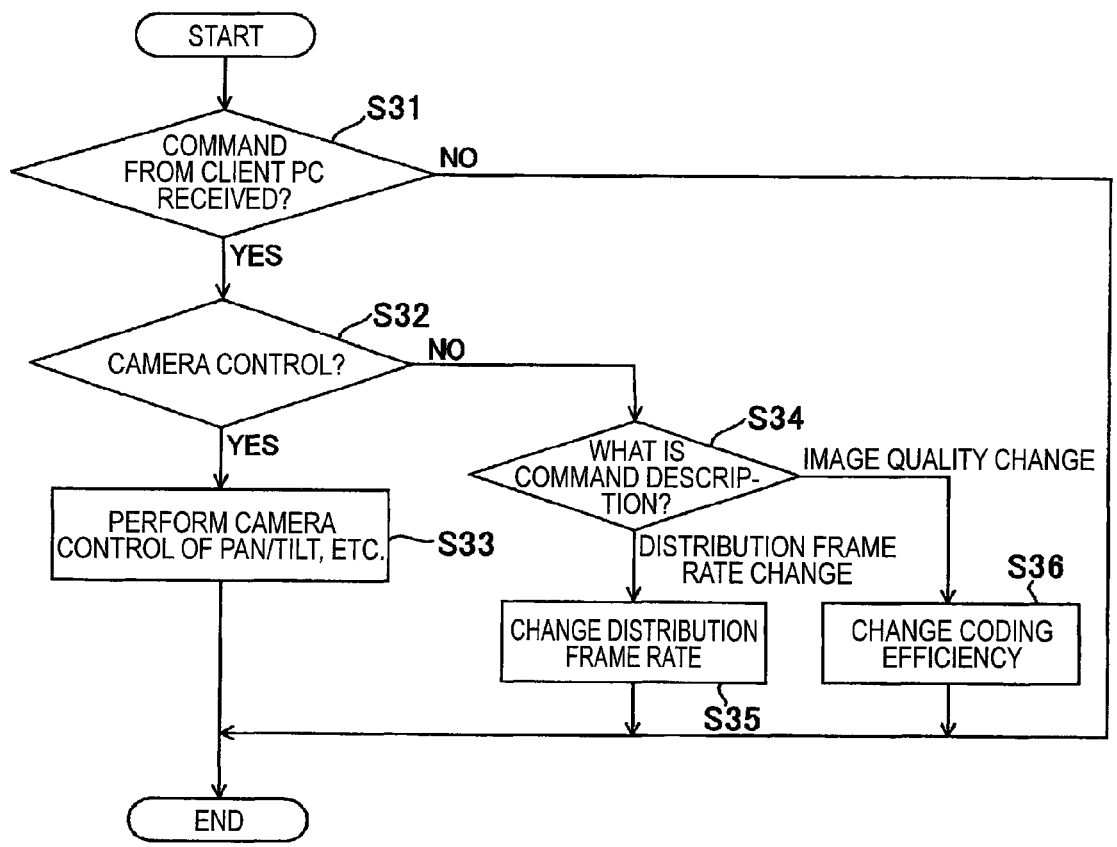
FIG. 5 is a flowchart to show an operation and setting operation procedure of the camera unit in the embodiment.

FIG. 5 is a flowchart to show an operation and setting operation procedure of the camera unit 20. This operation is repeated every predetermined period. To begin with, the camera unit 20 determines whether or not a command from the client PC 40 has been received through the network 10 (step S31). When a command from the client PC 40 has been received, the camera unit 20 determines whether or not the command description is camera control of pan/tilt operation, etc., (step S32). If the command description is camera control, the camera unit 20 performs camera control of pan/tilt, etc., by the camera control section 22 in accordance with the command description (step S33). Then, the operation is terminated.

On the other hand, if the command description is not camera control at step S32, the camera unit 20 determines the command description (step S34). If the command description is change of the distribution frame rate, the camera unit 20 changes the distribution frame rate of the video data distributed in the video distribution section 25 by the video distribution control section 26 (step S35). Then, the operation is terminated. On the other hand, if the command description is change of image quality at step S34, the camera unit 20 changes the coding efficiency of the compression ratio, etc., of the video data coded in the video coding section 23 by the video coding control section 24 (step S36). Then, the operation is terminated. If the command description is change of image quality, the coding efficiency of the compression ratio, etc., is changed to change the image quality in the embodiment, but the mode is not limited to it and the resolution of an image taken by the image pickup section of the camera unit may be changed or the defocus degree of focus may be adjusted.

Figure 6:
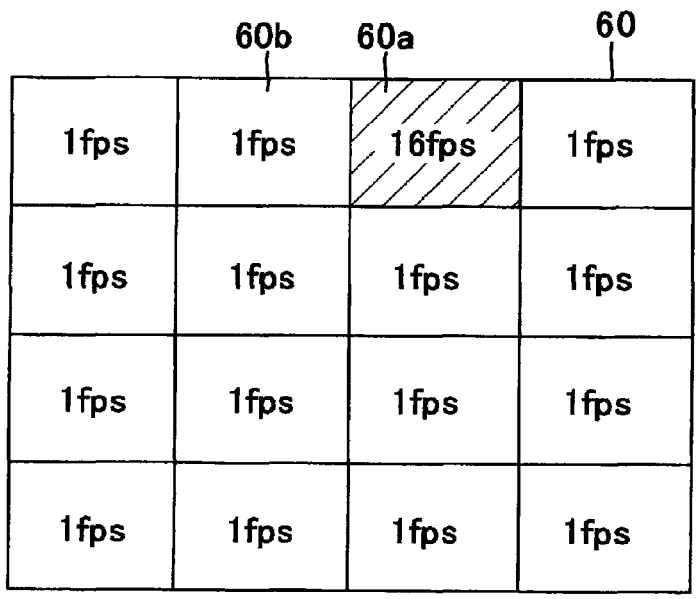
FIG. 6 is a drawing to schematically show a monitor video screen displayed on a display in the embodiment.

FIG. 6 is a drawing to schematically show a monitor video screen displayed on the display 60. As described above, 16 camera units are installed in the multi-monitor video system of the embodiment. A video image based on the video data distributed from the corresponding camera unit is displayed on the screen of each channel of the display 60 split into 16 screens. Here, the camera unit 20 is to be controlled and the video image is updated at a frame rate of 16 fps on a split screen 60a for displaying the video image based on the video data distributed from the camera unit 20. On the other hand, the video image is updated at a frame rate of 1 fps on any other split screen 60b. The split screen 60a of the camera unit to be controlled may be set to the maximum frame rate in response to the transmission capacity and the processing capability of the system, and a still image (0 fps) may be adopted for any other split screen 60b in an extreme case. According to such multiple screen display, when the operator performs operation of pan/tilt, etc., for the camera unit 20 while seeing the display 20, he or she can clearly see the outline and motion of the subject on the split screen 60 of the video image of the camera unit to be controlled, so that operability at the camera control time can be enhanced.

Thus, to produce multiple screen display for displaying video images from a plurality of camera units at the same time, the video monitor system of the first embodiment increases the reception rate of the video data distributed from the camera unit to be controlled and decreases the reception rate of the video data distributed from any other camera unit. Accordingly, the frame rate (update frequency) of the split screen for displaying the video image of the camera unit to be controlled becomes high as compared with that of any other camera unit and the quality of the video image required at the control time can be enhanced. Therefore, if there are restrictions on the transmission capacity and the processing capability of the whole system, it is made possible to visually recognize the video image clearly during the camera control and when operation of pan/tilt, etc., is performed for the camera unit, operability can be improved.

In the embodiment, the distribution frame rate of the camera to be controlled is increased and the distribution frame rate of any other camera is decreased; however, if there is an allowance for the transmission capacity of communications, only the distribution frame rate of the camera to be controlled may be increased without changing the distribution frame rate of any other camera.

(Second Embodiment)

A second embodiment is characterized in that when video data photographed and coded by a camera unit is decoded in a client PC, the decode frame rate of the conversion speed per frame is changed. That is, the decode frame rate is increased for the camera unit to be controlled and is decreased for any other camera unit. The decode frame rate control can be applied when video data of JPEG, MPEG-4, etc., for example, is used.

The hardware configuration of a multi-video monitor system of the second embodiment is similar to that of the first embodiment described above. The description to follow centers on the characteristic operation of the second embodiment.

Figure 7:
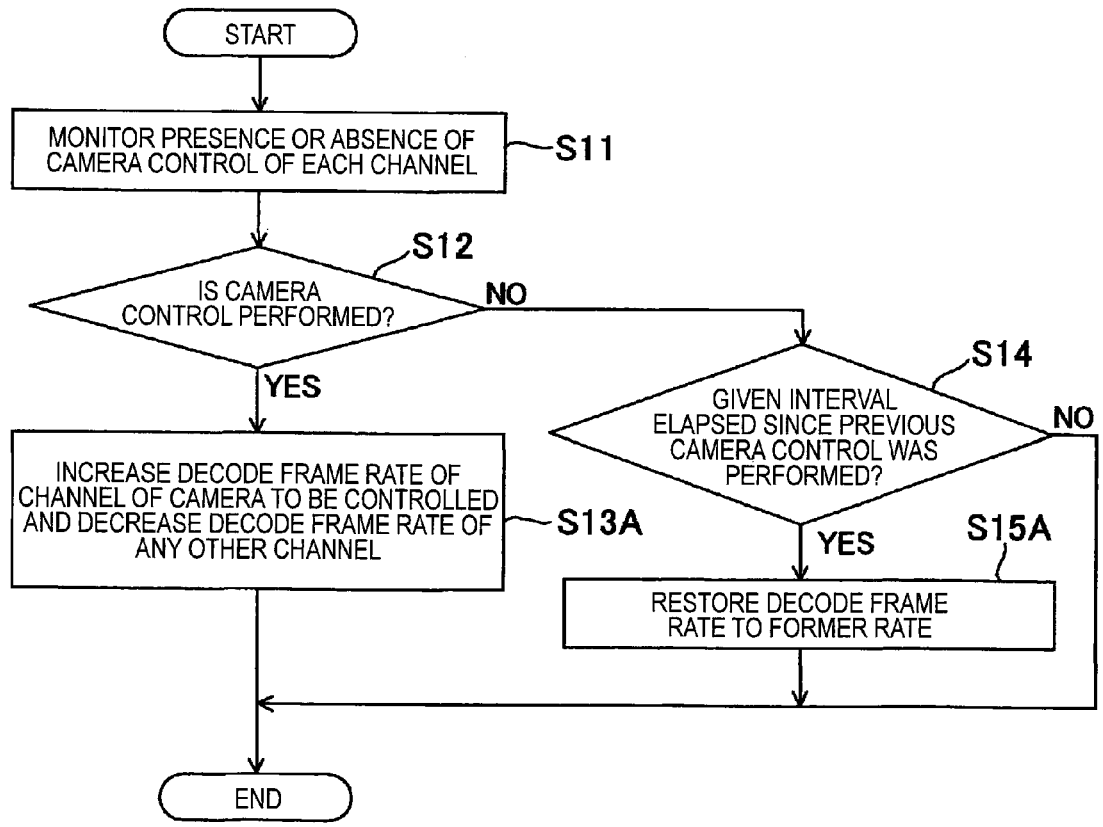
FIG. 7 is a flowchart to show a decode frame rate change processing procedure in a second embodiment of the invention.

FIG. 7 is a flowchart to show a decode frame rate change processing procedure in the second embodiment. The processing program is stored in a storage medium in a client PC 40 and is repeated every predetermined period (for example, 1 sec) by a CPU in the client PC 40. Steps identical with those of the first embodiment described above are denoted by the same step numbers and will not be discussed again.

If camera control is performed at step S12, the client PC 40 commands a video decoding control section 42 to increase the decode frame rate corresponding to the channel of video data distributed from the camera unit to be controlled and decrease the decode frame rate of any other channel by a video decoding management section 50 (step S13A). Upon reception of the command, the video decoding control section 42 increases the decode frame rate of a video decoding section corresponding to the camera unit to be controlled and decreases the decode frame rate of a video decoding section corresponding to any other camera unit. For example, if the coding system in the camera unit is MPEG-4, when the decode frame rate is changed, only a specific screen of the camera unit to be controlled is set to a full rate and other screens are thinned out. If the video data is all made up of key frames (I frames), only a specific screen of the camera unit to be controlled remains unchanged and key frames are thinned out for any other screen.

When a given time interval has elapsed at step S14, the client PC 40 commands the video decoding control section 42 to restore the decode frame rates of all video decoding sections to the former initial value by the video decoding management section 50 (step S15A). Upon reception of the command, the video decoding control section 42 restores the decode frame rates of all video decoding sections to the former initial value.

Thus, in the video monitor system of the second embodiment, the frame rate of the split screen for displaying the video image of the camera unit to be controlled becomes high as compared with that of any other camera unit and the quality of the video image required for visual recognition at the camera control time can be enhanced as with the first embodiment. Therefore, operability when operation of pan/tilt, etc., is performed for the camera unit can be improved. Since all processing is performed in the client PC, communications with each camera unit through the network become unnecessary and the system can be easily implemented. The load on the network can also be lightened and the system is effective for one-to-multiple communications such as multicast.

In the embodiment, the decode frame rate of the camera to be controlled is increased and the decode frame rate of any other camera is decreased; however, if there is an allowance for the processing capability of the client PC, only the decode frame rate of the camera to be controlled may be increased without changing the decode frame rate of any other camera.

(Third Embodiment)

A third embodiment is characterized in that when the frame rate of a split screen for displaying the video image of a camera unit to be controlled, the drawn frame rate is controlled. As described above, as control of the drawn frame rate, control of changing the number of update frames per unit time of the video data stored in decoded video memory, control of changing the number of read frames per unit time of the video data read from the decoded video memory, or control of changing the display area of the video data stored in the decoded video memory is performed. The drawn frame rate control can be applied when video data of JPEG, MPEG-4, etc., for example, is used.

The hardware configuration of a multi-video monitor system of the third embodiment is similar to that of the first embodiment described above. The description to follow centers on the characteristic operation of the third embodiment.

Figure 8:
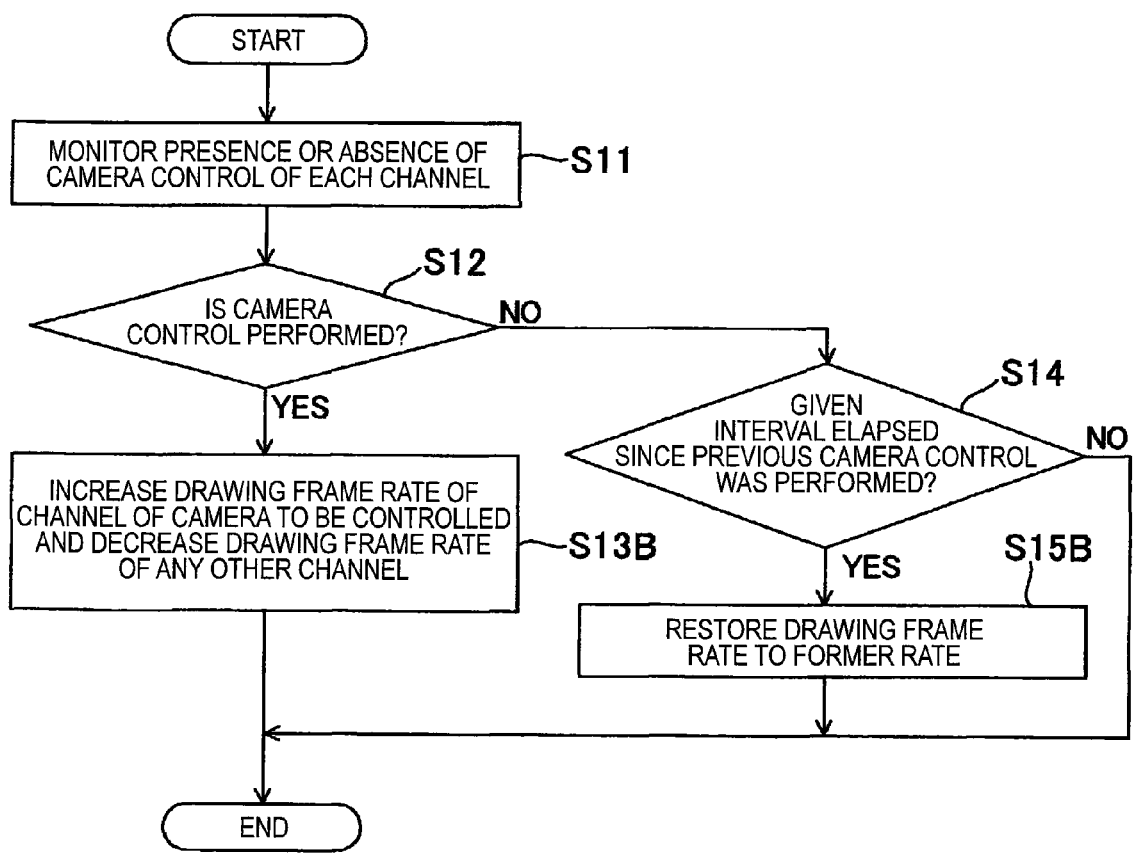
FIG. 8 is a flowchart to show a drawing frame rate change processing procedure in a third embodiment of the invention.

FIG. 8 is a flowchart to show a drawn frame rate change processing procedure in the third embodiment. The processing program is stored in a storage medium in a client PC and is repeated every predetermined period (for example, 1 sec) by a CPU in the client PC. Steps identical with those of the first embodiment described above are denoted by the same step numbers and will not be discussed again.

If camera control is performed at step S12, the client PC 40 commands a video display control section 51 to increase the drawn frame rate corresponding to the channel of video data distributed from the camera unit to be controlled and decrease the drawn frame rate of any other channel by a video display management section 52 (step 513B). Upon reception of the command, the video display control section 51 increases the drawn frame rate of decoded video memory corresponding to the camera unit to be controlled and decreases the drawn frame rate of decoded video memory corresponding to any other camera unit. That is, the video display control section 51 performs control of changing the number of update frames per unit time of the video data stored in the decoded video memory, control of changing the number of read frames per unit time of the video data read from the decoded video memory, or control of changing the display area of the video data stored in the decoded video memory.

When a given time interval has elapsed at step S14, the client PC 40 commands the video display control section 51 to restore the drawn frame rates for all decoded video memories to the former initial value by the video display management section 52 (step S15B). Upon reception of the command, the video display control section 51 restores the drawn frame rates for all decoded video memories to the former initial value.

Thus, the video monitor system of the third embodiment can also provide advantages similar to those of the second embodiment described above. In the third embodiment, the drawn frame rate of the camera to be controlled is increased and the drawn frame rate of any other camera is decreased; however, if there is an allowance for the processing capability of the client PC, only the drawn frame rate of the camera to be controlled may be increased without changing the drawn frame rate of any other camera.

It is to be understood that the invention is not limited to the items shown in the embodiments described above and the invention also intends that those skilled in the art make changes, modifications, and applications based on the Description and widely known arts, and the changes, the modifications, and the applications are also contained in the scope to be protected.

For example, the distribution frame rate, the decode frame rate, the drawn frame rate, the image quality (coding efficiency of compression ratio, etc., resolution of image, focus), and the like shown in the embodiments described above may be combined as desired and it is expected that operability will be furthermore improved by combining them appropriately.

The invention can also be applied to the case where a plurality of camera units are operated at the same time and the number of camera units to be controlled becomes two or more. To do this, the distribution frame rate, the decode frame rate, the drawn frame rate, the image quality, etc., described above can be changed in a similar manner for a plurality of camera units. In this case, however, the change degree lessens as compared with the case where one camera unit is to be controlled.

As described above, according to the embodiments, to produce multiple screen display for displaying video images taken by a plurality of cameras, etc., as multiple screens in one screen, the update frequency of the screen corresponding to the camera to be controlled becomes high as compared with that of any other camera and operability at the camera control time can be improved. The update frequency of the screen for displaying the video image taken by the camera placed in the control target can be made higher than the update frequency of the screen not placed in the control target and operability at the camera control time can be improved. Therefore, to produce multiple screen display using a plurality of video images, it is made possible to enhance the quality of the video image corresponding to the image pickup section of the camera, etc., to be controlled as compared with that corresponding to any other camera, etc., and operability can be improved.

While the invention has been described in detail with reference to the specific embodiments, it will be obvious to those skilled in the art that various changes and modifications can be made without departing from the spirit and the scope of the invention.

This application is based on Japanese Patent Application (No. 2007-037899) filed on Feb. 19, 2007, which is incorporated herein by reference.

Industrial Applicability

The invention has the advantages that to display a plurality of video images as multiple screens in one screen, the quality of the video image corresponding to the video input section of the image pickup section to be controlled for controlling the image taking angle of view, etc., can be enhanced as compared with that of any other and it is made possible to improve the operability at the image pickup section control time, and is useful for a video display apparatus, a video display method, etc., applied to a multi-video monitor system, etc., for displaying video images provided by video input sections of a plurality of cameras, etc., on a screen.

The invention claimed is:

1. A video display apparatus for displaying video images provided by a plurality of video input sections on a screen, comprising:

a screen display section that displays a plurality of video images as multiple divided screens in one screen, the plurality of video images being provided by the plurality of video input sections containing at least one image pickup section; and a display video quality control section that, if the image pickup section being controlled exists in the plurality of video input sections, increases an update frequency of at least one divided screen for displaying a video image taken by an image pickup section being controlled to perform a pan or tilt operation as compared with an update frequency of any other divided screens for displaying a video image taken by any other image pickup sections not being controlled, the display video quality control section determines whether the image pickup section being controlled is performing the pan or tilt operation, and while the display video quality control section determines that the image pickup section being controlled is performing the pan or tilt operation, the display video quality control section increases the update frequency of said at least one divided screen for displaying the video image taken by the image pickup section being controlled to perform the pan or tilt operation as compared with the update frequency of said any other divided screens for displaying the video image taken by said any other image pickup sections either not being controlled or being controlled and not performing the pan or tilt operation.

2. The video display apparatus according to claim 1 further comprising:
a control target determination section that determines whether or not the image pickup section being controlled exists among the plurality of video input sections; and
a control time determination section that determines whether or not a predetermined time has elapsed since the image pickup section is placed out of the control target,
wherein when the predetermined time has elapsed, the display video quality control section restores the update frequency of the screen corresponding to the image pickup section placed out of the control target in the screen display section to the former update frequency.

3. The video display apparatus according to claim 1, wherein
the display video quality control section increases a distribution frame rate of the video data distributed from the image pickup section being controlled and decreases the distribution frame rate of the video data distributed from any other image pickup sections not being controlled.

4. The video display apparatus according to claim 3, wherein
the display video quality control section controls the video data distributed from
said any other image pickup sections not being controlled to become a still image.

5. The video display apparatus according to claim 1,
wherein the display video quality control section increases a decode frame rate in decoding the video data coded by the image pickup section being controlled and decreases the decode frame rate in decoding the video data coded by any other image pickup sections not being controlled.

6. The video display apparatus according to claim 1,
wherein the display video quality control section increases a drawing frame rate in drawing using the video data from the image pickup section being controlled and decreases the drawing frame rate in drawing using the video data from any other image pickup sections not being controlled.

7. The video display apparatus according to claim 1,
wherein the display video quality control section increases an update frequency of the screen for displaying the video image taken by the image pickup section being controlled and makes high an image quality of the video image distributed from the image pickup section to be controlled as compared with the image quality of the video image distributed from any other image pickup sections not being controlled.

8. The video display apparatus according to claim 1, wherein the display video quality control section changes the update frequency using at least two of the distribution frame rate of the video data distributed from the image pickup section being controlled, the decode frame rate in decoding the video data and the drawing frame rate in drawing using the video data.

9. A video display apparatus for displaying a video image taken by an image pickup section on a screen, comprising:
a screen display section that displays the video image provided by the image pickup section;
a control target determination section that determines whether or not the image pickup section is being controlled; and
a display video quality control section that, if the image pickup section is being controlled, increases an update frequency of at least one divided screen for displaying a video image taken by an image pickup section being controlled to perform a pan or tilt operation as compared with an update frequency of any other divided screens applied if the image pickup section is not being controlled,
the display video quality control section determines whether the image pickup section being controlled is performing the pan or tilt operation, and
while the display video quality control section determines that the image pickup section being controlled is performing the pan or tilt operation, the display video quality control section increases the update frequency of said at least one divided screen for displaying the video image taken by the image pickup section being controlled to perform the pan or tilt operation as compared with the update frequency of said any other divided screens for displaying the video image taken by said any other image pickup sections either not being controlled or being controlled and not performing the pan or tilt operation.

10. A video display method of displaying video images provided by a plurality of video input sections on a screen, the method comprising:
a screen display step of displaying a plurality of video images as multiple divided screens in one screen in a screen display section, the plurality of video images being provided by the plurality of video input sections containing at least one image pickup section;
a control target determination step of determining whether or not an image pickup section being controlled exists among the plurality of video input sections, and
a display video quality control step of increasing, if the image pickup section being controlled exists in the plurality of video input sections, an update frequency of at least one divided screen for displaying a video image taken by an image pickup section being controlled to perform a pan or tilt operation as compared with an update frequency of any other divided screens for displaying a video image from any other image pickup section not being controlled,
said display video quality control step further including determining whether the image pickup section being controlled is performing the pan or tilt operation, and
when the image pickup section being controlled is performing the pan or tilt operation, increasing the update frequency of said at least one divided screen for displaying the video image taken by the image pickup section being controlled to perform the pan or tilt operation as compared with the update frequency of said any other divided screens for displaying the video image taken by said any other image pickup sections either not being controlled or being controlled and not performing the pan or tilt operation.

11. An information processing apparatus being connected to a plurality of video input sections containing at least one image pickup section and displaying a video image on a display using the video data provided by the video input sections, the information processing apparatus comprising:
a screen display section that displays a plurality of video images as multiple divided screens in one screen on the display, the plurality of video images being provided by the plurality of video input sections containing the image pickup section;
a control target determination section that determines whether or not the image pickup section being controlled exists among the plurality of video input sections; and
a display video quality control section that, if the image pickup section being controlled exists in the plurality of video input sections, increases an update frequency of at least one divided screen for displaying a video image taken by an image pickup section being controlled to perform a pan or tilt operation as compared with an update frequency of any other divided screens for displaying a video image from any other image pickup sections not being controlled,
the display video quality control section determines whether the image pickup section being controlled is performing the pan or tilt operation, and
while the display video quality control section determines that the image pickup section being controlled is performing the pan or tilt operation, the display video quality control section increases the update frequency of said at least one divided screen for displaying the video image taken by the image pickup section being controlled to perform the pan or tilt operation as compared with the update frequency of said any other divided screens for displaying the video image taken by said any other image pickup sections either not being controlled or being controlled and not performing the pan or tilt operation.

12. A non-transitory computer readable recording medium storing a program for causing a computer to function as the means of any of the video display apparatus according to claim 1.

* * * * *